(12) United States Patent
Kwok et al.

(10) Patent No.: US 10,594,756 B2
(45) Date of Patent: Mar. 17, 2020

(54) NETWORK CONFIGURATION USING DYNAMIC VOICE CODEC AND FEATURE OFFERING

(71) Applicant: T-Mobile USA, Inc., Bellevue, WA (US)

(72) Inventors: Ming Shan Kwok, Seattle, WA (US); Homer Nicolas B. Filart, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 99 days.

(21) Appl. No.: 15/841,873

(22) Filed: Dec. 14, 2017

(65) Prior Publication Data

US 2019/0068676 A1 Feb. 28, 2019

Related U.S. Application Data

(60) Provisional application No. 62/548,752, filed on Aug. 22, 2017.

(51) Int. Cl.
*H04L 29/06* (2006.01)
*H04L 1/00* (2006.01)

(52) U.S. Cl.
CPC .......... *H04L 65/605* (2013.01); *H04L 1/0014* (2013.01); *H04L 65/1016* (2013.01); *H04L 65/1069* (2013.01); *H04L 65/607* (2013.01); *H04L 65/80* (2013.01)

(58) Field of Classification Search
CPC ............... H04L 1/0014; H04L 65/1016; H04L 65/1069; H04L 65/605; H04L 65/607; H04L 65/80
See application file for complete search history.

(56) References Cited

U.S. PATENT DOCUMENTS

| 2006/0098622 | A1* | 5/2006 | Chang | H04L 29/06027 370/352 |
| 2015/0141003 | A1* | 5/2015 | Dumbleton | H04W 4/20 455/433 |
| 2016/0119384 | A1* | 4/2016 | Karimli | H04L 65/1069 370/252 |
| 2016/0249313 | A1* | 8/2016 | Narkar | H04W 8/00 |
| 2017/0148448 | A1* | 5/2017 | Greer | G10L 19/24 |

OTHER PUBLICATIONS

PCT Search Report and Written Opinion dated Oct. 30, 2018 for PCT Application No. PCT/US18/43340, 13 pages.

* cited by examiner

*Primary Examiner* — Michael C Lai
(74) *Attorney, Agent, or Firm* — Lee & Hayes, P.C.

(57) ABSTRACT

Technologies for network configuration using dynamic voice codec and feature offering are described herein. A translation codec is used to allow a device capable of using enhanced voice services to use the enhanced voice services when communicating with a device that is not capable of using enhanced voice services.

14 Claims, 5 Drawing Sheets

NETWORK CONFIGURATION USING DYNAMIC VOICE CODEC AND FEATURE OFFERING

CROSS REFERENCE TO RELATED APPLICATIONS

This application claims priority to U.S. Provisional Patent Application Ser. No. 62/548,752, entitled, "Dynamic Voice Codec & Feature Offering/Answering for IP Multimedia Services," filed on Aug. 22, 2017, which is incorporated herein by reference in its entirety as if fully set forth herein.

BACKGROUND

Enhanced Voice Services ("EVS") are typically implemented through a super-wideband speech audio coding standard. EVS can provide up to 20 kHz audio bandwidth and can have robustness to delay jitter and packet losses due to its channel aware coding and improved packet loss concealment. EVS uses 50 Hz to 20 KHz audio bandwidth that encompasses narrowband, wideband, super-wideband, and full-band voice communications. EVS has been developed in 3rd Generation Partnership Project ("3GPP") and is described in 3GPP TS 26.441.

EVS can auto-conceal errors and can quickly recover by interpolating lost packets. EVS features source-controlled variable bit-rate ("VBR") adaptation for better speech quality at the same average active bit rate than fixed rate coding. EVS can be backward compatible with Adaptive Multi-rate Wideband ("AMR-WB") codec standards and can be used for 2G and 3G networks to reduce bandwidth demands while maintaining the same voice quality. EVS has put in place error resilience mechanisms for both circuit-switched 2G and 3G voice services as well as packet-switched Voice over Internet Protocol ("VoIP") applications.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Described herein are technologies for network configuration using dynamic voice codec translation and feature offering. In conventional systems, when a call is made to or from a cellular device not configured to use a voice service, such as EVS, the network typically downgrades the service, e.g. limits audio bandwidth and bitrate, to the lower service. For example, a party may place a call using a cellular device capable of using EVS to a cellular device not capable of using EVS, such as cellular device only capable of AMR-WB. In that instance, a conventional network, detecting a non-EVS enabled device, typically will downgrade the service to AMR-WB because AMR-WB is the common set of capabilities. In some examples, a subscription type associated with a user associated with a device may be used to determine whether or not the device is capable of using EVS.

In various configurations of the presently disclosed subject matter, a cellular device not capable of receiving or transmitting using EVS will not cause the downgrade of service for cellular device capable of using EVS. In some configurations, the network will indicate to a device using EVS that the accompanying device (or devices in a multi-line call or conference call) can use EVS. Instead of downgrading the call service to a non-EVS format, the network will maintain the EVS-capable device at EVS levels and, using a dynamic translator, modify communications between the devices so the devices each can use their own highest capabilities without downgrading the other if not so configured.

While the technical details are presented herein in the general context of program modules, those skilled in the art will recognize that the configurations can also be implemented in combination with other program modules. Generally, program modules include routines, programs, components, data structures, and other types of structures that perform particular tasks or implement particular abstract data types.

Moreover, those skilled in the art will appreciate that the configurations described herein can be practiced with various computer system configurations, including hand-held devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In the following detailed description, references are made to the accompanying drawings that form a part hereof, and in which are shown by way of illustration specific configurations or examples. Referring now to the drawings, aspects of the various implementations provided herein and an exemplary operating environment will be described.

Figure 1:
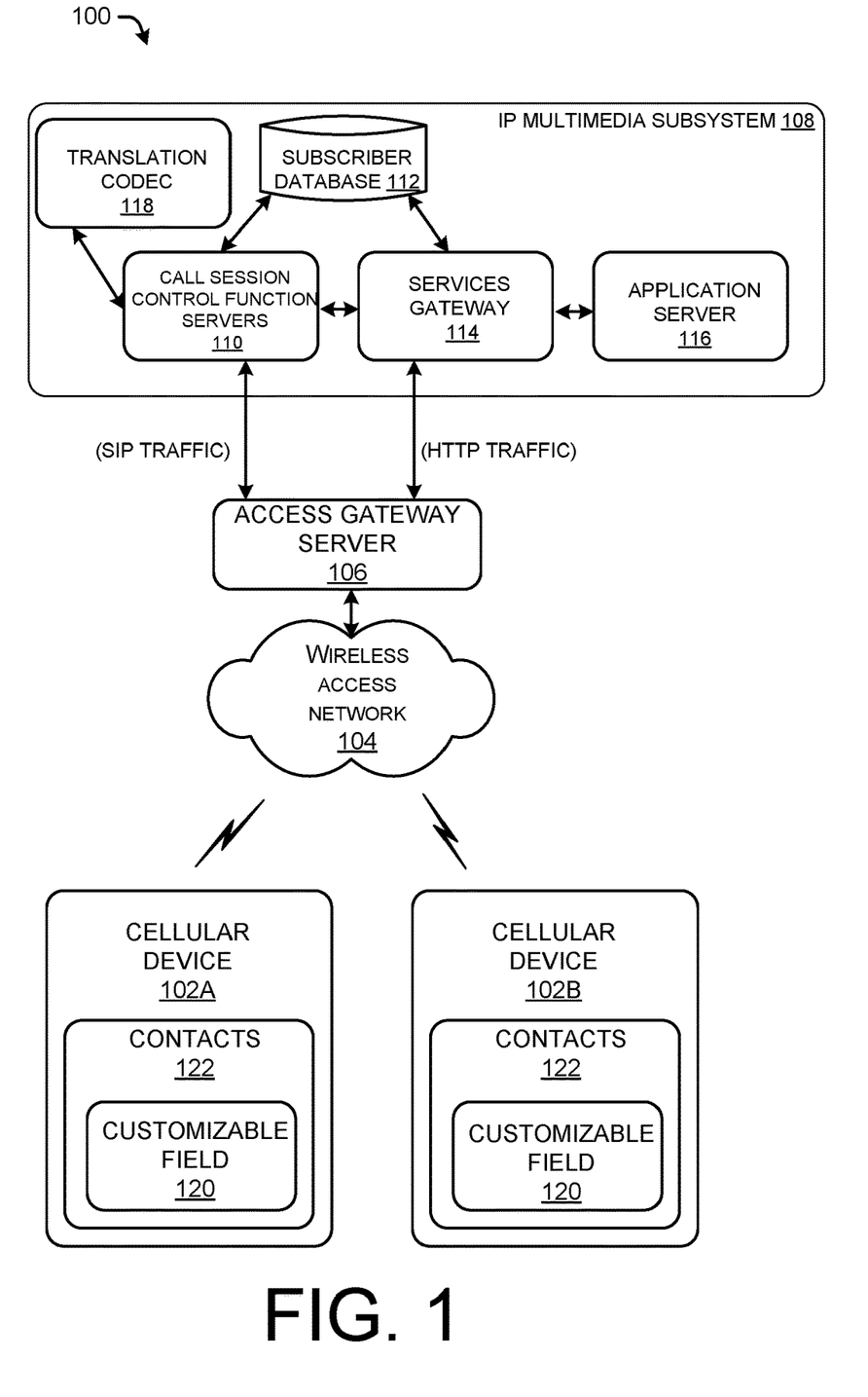
FIG. 1 is a block diagram that illustrates a system for network configuration using dynamic voice codec and feature offering.

FIG. 1 is a block diagram that illustrates a system 100 for network configuration using dynamic voice codec translation and feature offering. It should be understood that although FIG. 1 is described in the context of an IMS network, other networks may be used and are considered to be within the scope of the presently disclosed subject matter. Cellular devices 102A and 102B can connect via a wireless access network 104 to an access gateway server 106. Further, although technologies are described herein using EVS, it should be understood that the technologies may be used in other voice service technologies currently in use or implemented in the future. The presently disclosed subject matter is not limited to EVS.

The cellular devices 102A and 102B can be of various types configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, and/or similar cellular devices.

The cellular devices 102A and 102B can be capable of communicating over wired networks, and/or wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, and/or any future IP-based network technology or evolution of an existing IP-based network technology.

In the system 100 of FIG. 1, the connection across the wireless access network 104 is Internet Protocol (IP)-based, permitting the delivery of Session Initiation Protocol ("SIP") network traffic as well as Hypertext Transfer Protocol ("HTTP") network traffic. The access gateway server 106 is connected to an IP Multimedia Subsystem ("IMS") 108. In some examples, the access gateway server 106 may represent an Evolved Packet Core ("EPC") system, as well as future packet core systems such as equivalent systems in 5th generation ("5G") mobile networks and future iterations. SIP traffic flows between the access gateway server 106 and one or more Call Session Control Function servers 110, which are located within the IMS 108.

The Call Session Control Function servers 110 are communicatively coupled with a subscriber database 112, which may be utilized during the IMS registration process for registering users and their communication devices with the IMS 108. Registration with the IMS 108 may include verifying the user's identity, recording a device ID for their communication device(s), checking the user's payment history, and other functions. In addition, the subscriber database 112 may keep track of a list of security associations, online applications that the user are allowed to access or that the user are not allowed to access, or rules regarding the use of multiple cellular numbers associated with the cellular device 102A or the cellular device 102B. The subscriber database 112 may also keep track of cellular device capabilities if the cellular device, such as the cellular device 102A or 102B is registered with the subscriber database 112 (e.g. is a customer of the system 100). In some examples, cellular device capabilities include an international mobile equipment identifier (IMEI), or an International Mobile Subscriber Identity (IMSI).

The system 100 includes a services gateway 114. The services gateway 114 in the IMS 108 verifies a user's registration with the IMS 108 and generates an authorization token for the user. The token is sent to the cellular device 102A using an encrypted Session Initiation Protocol (SIP) message. When the user wants to access an online application program, a program or browser running on the communication device generates an HTTP or HTTPS request to a services gateway (SG) on the IMS. (Note that that where "HTTP" is used herein, the system may also represent secure HTTP communications using encryption or HTTPS). Additional details of the IMS 108, including the Call Session Control Function servers 110, may be found in the U.S. Pat. No. 8,762,559, entitled "System and Method for Non-IMS Application Service Access Over IP Multimedia Subsystem," filed on Dec. 16, 2011, which is herein incorporated by reference in its entirety.

The IMS 108 further includes an application server 116. The application server 116 is a software framework that provides both facilities to create web applications and a server environment to run the web applications. The application server 116 is a system software upon which web applications or desktop applications run. In some configurations, the IMS 108 acts as a service delivery platform.

In some examples of the presently disclosed subject matter, when placing or receiving a call, the IMS 108, or other cellular network depending on the particular type of cellular network provides for the ability to use of specified voice services, such as EVS, even if the other cellular device is not so configured. Using FIG. 1 as an example, the cellular device 102A is a calling (or originating) device and the cellular device 102B is a receiving device. During the call setup, the cellular device 102A provides to the IMS 108 (acting as the service delivery platform) the capabilities of the cellular device 102A. For example, the cellular device 102A can provide to the IMS 108 that the cellular device 102A is capable of using EVS narrowband ("NB") to super-wideband ("SWB") and AMR wideband ("AMR-WB").

The IMS 108 receives the capabilities of the cellular device 102A and attempts to make a connection to the receiving device, i.e. the cellular device 102B. During the call setup message flow, the cellular device 102B provides to the IMS 108 the capabilities of the cellular device 102B. In the present example, the cellular device 102B transmits to the IMS 108 that the cellular device 102B is capable of EVS (NB-WB). Because the cellular device 102A and the cellular device 102B have a common set of capabilities, e.g. EVS-NB and EVS-WB, the call can be setup using EVS-WB as EVS-WB has the widest bandwidth and highest bitrate of the common set of capabilities.

The prior example is an example when both devices have common EVS capabilities. The following is an example if the receiving cellular device does not have EVS capabilities. In this example, the cellular device 102A is a calling device and the cellular device 102B is a receiving device. During the call setup, the cellular device 102A provides to the IMS 108 (acting as the service delivery platform) the capabilities of the cellular device 102A. For example, the cellular device 102A can provide to the IMS that the cellular device 102A is capable of EVS narrowband ("NB") to super-wideband ("SWB") and AMR wideband ("AMR-WB").

The IMS 108 receives the capabilities of the cellular device 102A and attempts to make a connection to the receiving device, or the cellular device 102B. During the call setup message flow, the cellular device 102B provides to the IMS 108 the capabilities of the cellular device 102B. In this example, the cellular device 102B transmits to the IMS 108 that the cellular device 102B is capable of AMR-WB. In this example, the common set of capabilities between the cellular device 102A and the cellular device 102B is AMR-WB. In convention systems, using the common set of capabilities, the call would be setup using AMR-WB bandwidth and bitrate.

However, the presently disclosed subject matter provides for the ability to setup the call whereby the cellular device 102A uses EVS and the cellular device 102B uses AMR-WB. To provide this functionality, the IMS 108 has a translation codec 118. In some examples, the translation codec 118 is a software program whereby communications using EVS are translated and transmitted using lower capabilities, such as AMR-WB, and in the reverse whereby communications using lower capabilities are translated and transmitted using EVS.

Using the translation codec 118, continuing with the present example in which the cellular device 102A is capable of EVS (NB-SWB) and the cellular device 102B is capable of AMR (WB), the IMS 108 will setup the call so the cellular device 102A can transmit using EVS (SWB) and the cellular device 102B can transmit using AMR (AMR-WB). In some examples, the cellular device 102A does not receive information that the cellular device 102B is not capable of EVS. Further, in some examples, the cellular device 102B does not receive information that the cellular device 102A is capable of EVS. Communications between the cellular device 102A and 102B are translated using the translation codec 118. Thus, the cellular device 102A transmits at EVS-SWB capabilities and the cellular device 102B transmits at AMR-WB capabilities.

The following is an example in which the calling (or originating) cellular device does not have EVS capabilities. In this example, the cellular device 102A is a calling device and the cellular device 102B is a receiving device. During the call setup, the cellular device 102A provides to the IMS 108 (acting as a service delivery platform) the capabilities of the cellular device 102A. For example, the cellular device 102A can provide to the IMS that the cellular device 102A is capable of AMR-WB.

The IMS 108 receives the capabilities of the cellular device 102A and attempts to make a connection to the receiving device, or the cellular device 102B. During the call setup message flow, the cellular device 102B provides to the IMS 108 the capabilities of the cellular device 102B. In this example, the cellular device 102B transmits to the IMS 108 that the cellular device 102B is capable of EVS narrow band ("NB") to super-wide band ("SWB").

Using the translation codec 118, continuing with the present example in which the cellular device 102A is capable of AMR (WB) and the cellular device 102B is capable of EVS (NB-SWB), the IMS 108 will setup the call so the cellular device 102A can transmit using AMR (WB) and the cellular device 102B can transmit using EVS (NB-SWB). In some examples, the cellular device 102A does not receive information that the cellular device 102B is capable of EVS. Further, the cellular device 102B does not receive information that the cellular device 102A is not capable of EVS. Communications between the cellular device 102A and 102B are translated using the translation codec 118. Thus, the cellular device 102A transmits at AMR-WB capabilities and the cellular device 102B transmits at EVS-SWB capabilities.

In some examples, the capabilities of the cellular device 102A or the cellular device 102B may already be known by the IMS 108. For example, the cellular device 102A or the cellular device 102B may be subscribers to the IMS 108. The IMS 108 may determine the capabilities of the cellular device 102A or the cellular device 102B using information about the devices stored in the subscriber database 112 without requiring or requesting device capabilities from the cellular device 102A or the cellular device 102B.

In some examples, a subscriber system may be established to allow EVS capabilities when a receiving or calling cellular device is capable of using EVS but the other cellular device is not. For example, a subscriber to the IMS 108 (such as a subscriber to a cellular telephone company) may have in their subscription the capability of always using EVS. In some examples, the subscription can include a rate plan that indicates EVS capabilities. In further examples, other information may be used, such as a subscriber preference. In these examples, the subscriber database 112 may have information that instructs the IMS 108 to setup a call using EVS even if the receiving device is not EVS-capable. Upon a request to setup a call from the cellular device 102A, the IMS 108 may access the subscriber database 112 to determine if the cellular device 102A has been enabled, through a subscription payment, to always be connected using EVS, even if a receiving cellular device, such as the cellular device 102B, is not capable of EVS.

Figure 2:
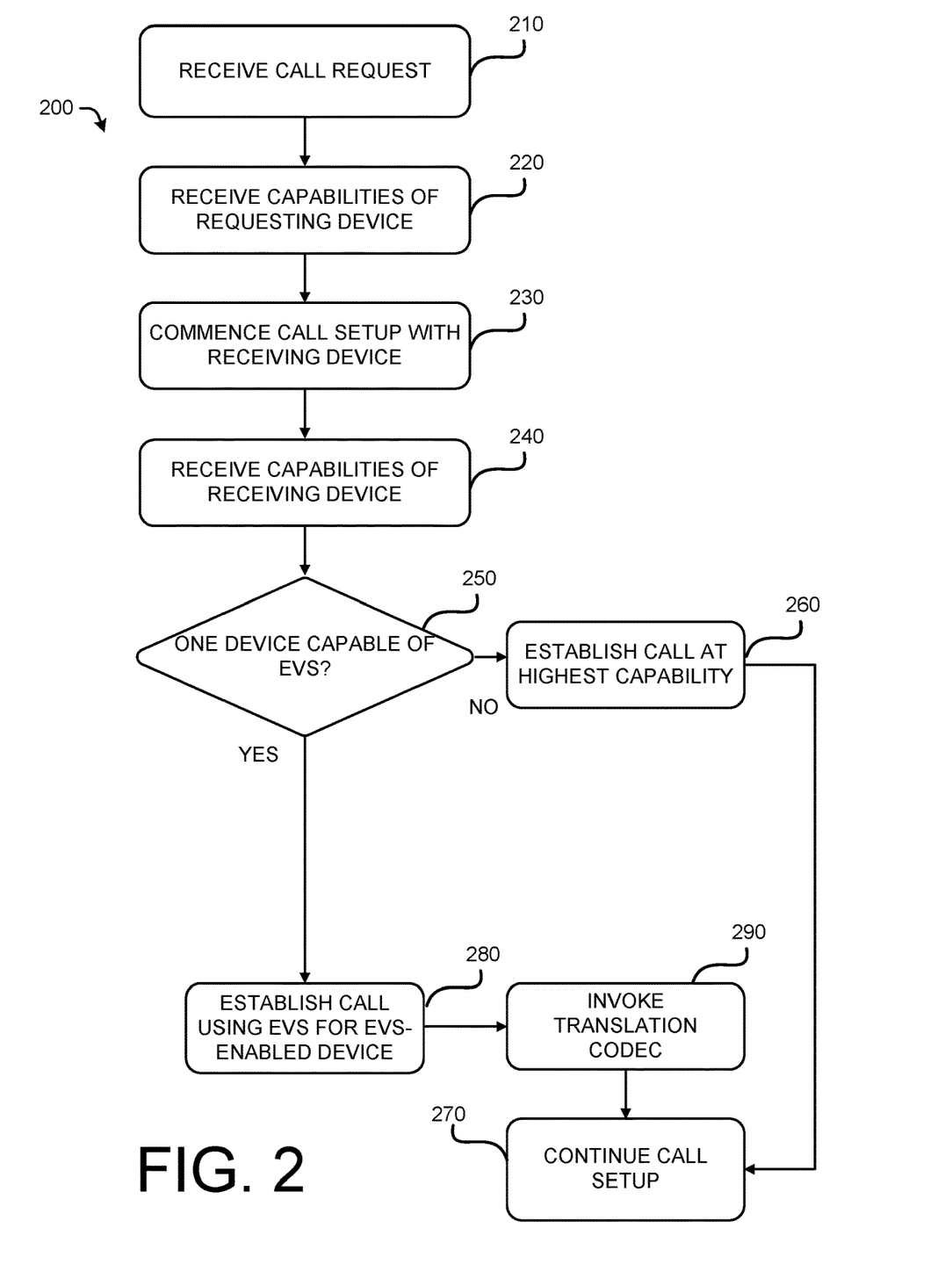
FIG. 2 is an illustrative process for network configuration using dynamic voice codec and feature offering.

FIG. 2 is an illustrative process 200 for network configuration using dynamic voice codec and feature offering. The process is illustrated as example flow graphs, each operation of which may represent a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Referring to FIG. 2, the network configuration using dynamic voice codec translation and feature offering process 200 commences at operation 210, where a call request is received by the cellular device 102A to connect with a receiving cellular device, the cellular device 102B.

The process 200 continues at operation 220, where the capabilities of the requesting device, i.e. the cellular device 102A, are received. During the call setup, the cellular device 102A provides to the IMS 108 (acting as the service delivery platform) the capabilities of the cellular device 102A. For example, the cellular device 102A can provide to the IMS 108 that the cellular device 102A is capable of specified voice services, such as EVS narrow band ("NB") to super-wide band ("SWB") and AMR wideband ("AMR-WB").

The process 200 continues at operation 230, where the call setup is continued with the receiving device, e.g. the cellular device 102B. During the call setup message flow process, the capabilities of the cellular device 102B are requested.

The process 200 continues at operation 240, where the capabilities of the receiving device are received. For example, the cellular device 102B can provide to the IMS 108 that the cellular device 102B is capable of AMR-WB.

The process 200 continues at operation 250, where a determination is made as to whether or not the cellular device 102A or the cellular device 102B is capable of EVS. If at operation 250 neither the cellular device 102A nor the cellular device 102B are capable of EVS, the process 200 continues to operation 260, where the call will be setup using the highest capability. The process 200 continues to operation 270, where the call setup is continued.

If at operation 250 either the cellular device 102A or the cellular device 102B is capable of EVS, the process 200 continues to operation 280, where the call is setup using EVS for the cellular device that is capable of using EVS. In the present example, the cellular device 102A indicated to the IMS 108 that the cellular device 102A is capable of using EVS. In some examples, it may be determined that the cellular device capabilities specified in the SIP message exchange do not conform to a network operator specification, and the determination may that the cellular device is not capable of using EVS regardless of what is specified by the cellular device capabilities.

Continuing with the present example, if at operation 250 the cellular device 102A informed the IMS 108 that the cellular device 102A is capable of utilizing EVS, the process 200 continues to operation 280, where the call is established using EVS for the EVS-enabled device.

The process 200 continues to operation 290, where the translation codec 118 is invoked. In some examples, the translation codec 118 will translate call information between EVS and non-EVS communications. For example, the cellular device 102A can receives and transmit in EVS, while the cellular device 102B can receive and transmit in AMR-WB. To allow communication between the two, the translation codec 118 is a dynamic translation mechanism to change the AMR-WB communications to EVS, and vice versa. As used herein, "dynamic" means the communications are translated as they are received. The process 200 continues to operation 270, where the call setup is continued.

Figure 3:
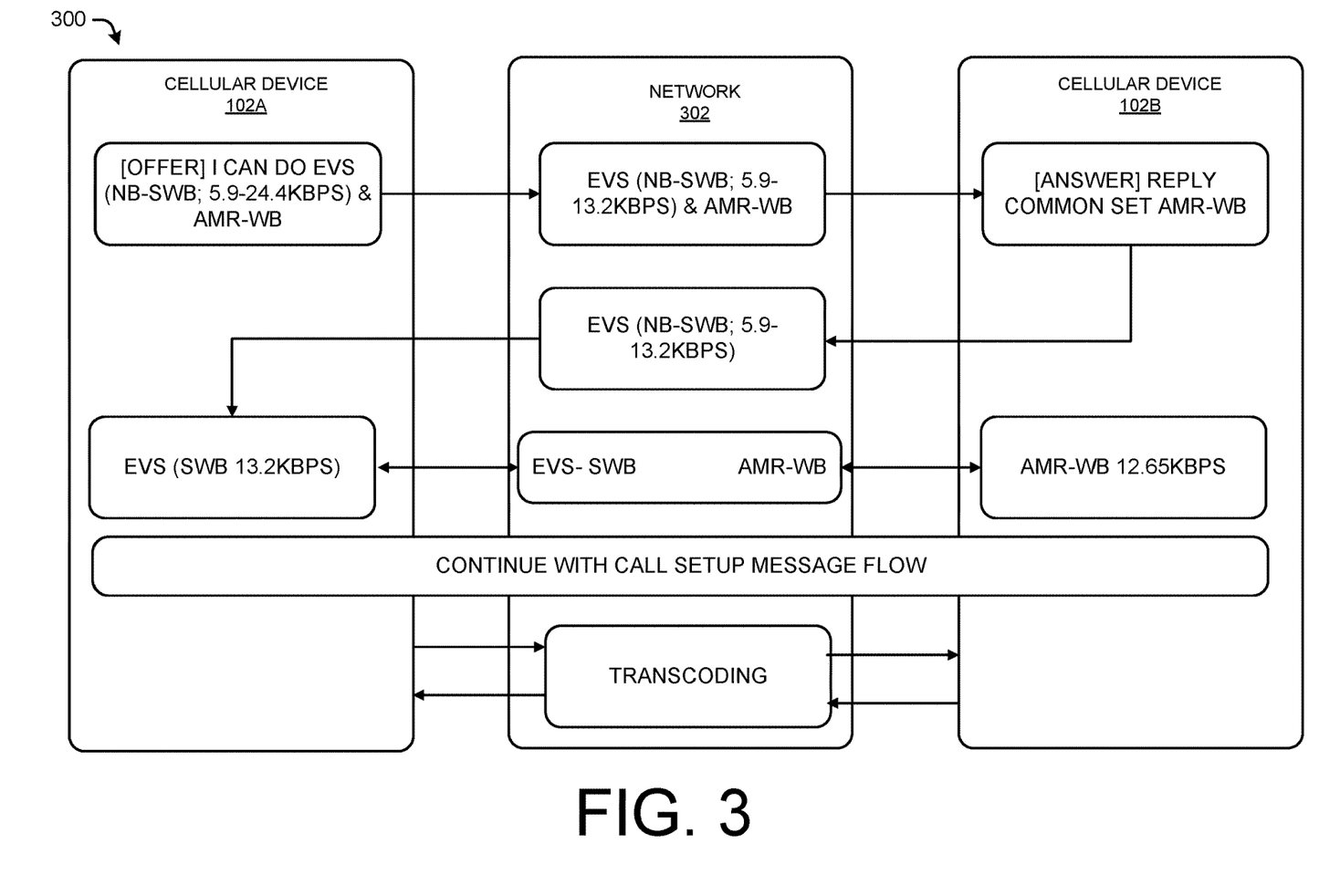
FIG. 3 is a graphical representation of a call setup process in which the receiving device is not EVS-capable.

FIG. 3 is a graphical representation of a call setup process 300 in which the receiving device is not EVS-capable. Beginning at [OFFER], the cellular device 102A, which is the initiating device in FIG. 3, offers to the network that the cellular device 102A is capable of transmitting using EVS-NB to EVS-SWB at bitrates of 5.9 kbps to 24.4 kbps and AMR-WB. The network 302 receives the offering from the cellular device 102A and determines that the network is capable of EVS-NB to EVS-SWB but at bit rates of 5.9 kbps to 13.2 kbps and AMR-WB. The cellular device 102B replies to the inquiry from the network 302 and transmits that the common set of capabilities between the cellular device 102A and 102B is AMR-WB.

The network 302 receives the common set and determines that the highest capability of transmitting is EVS-NB to -SWB at 5.9 kbps-13.2 kbps and transmits that information to the cellular device 102A. The cellular device 102A receives the capability information from the network 302 and configures its system to transmit using EVS-SWB at 13.2 kbps. The cellular device 102B configures its system to transmit using the common set, or AMR-WB. The network continues setting up the call. During the call, the information is transcoded between the EVS-SWB and the AMR-WB.

Figure 4:
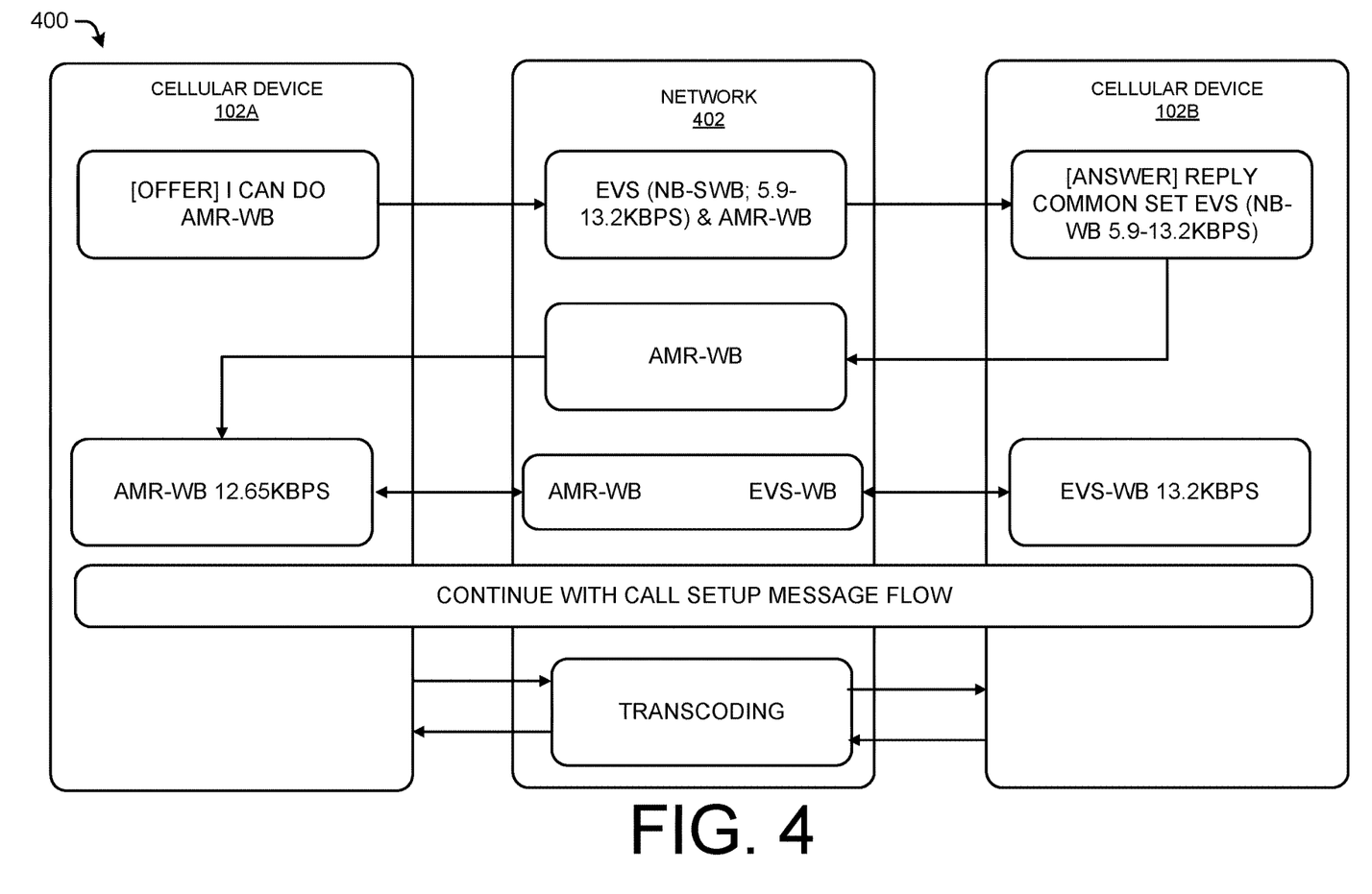
FIG. 4 is a graphical representation of a call setup process in which the originating device is not EVS-capable.

FIG. 4 is a graphical representation of a call setup process 400 in which the calling or originating device is not EVS-capable. Beginning at [OFFER], the cellular device 102A, which is the initiating device in FIG. 4, offers to the network that the cellular device 102A is capable of transmitting using AMR-WB. The network 402 receives the offering from the cellular device 102A and determines that the network is capable of EVS-NB to EVS-SWB but at bit rates of 5.9 kbps to 13.2 kbps and AMR-WB. The cellular device 102B replies to the inquiry from the network 402 and transmits that the common set of capabilities between the cellular device 102A and 102B is EVS-NB to EVS-SWB.

The network 402 receives the common set and determines that the highest capability of transmitting for the cellular device 102B is AMR-WB and informs the cellular device 102A to configure its system to transmit using AMR-WB. The network 402 informs the cellular device 102B to configure its system to transmit using EVS-SWB at 13.2 kbps. The network continues setting up the call. During the call, the information is transcoded between the EVS-SWB and the AMR-WB. The information can also be transcoded in any variant of EVS (i.e. EVS-NB or EVS-WS) for cellular device 102A and AMR-WB for cellular device 102B.

Figure 5:
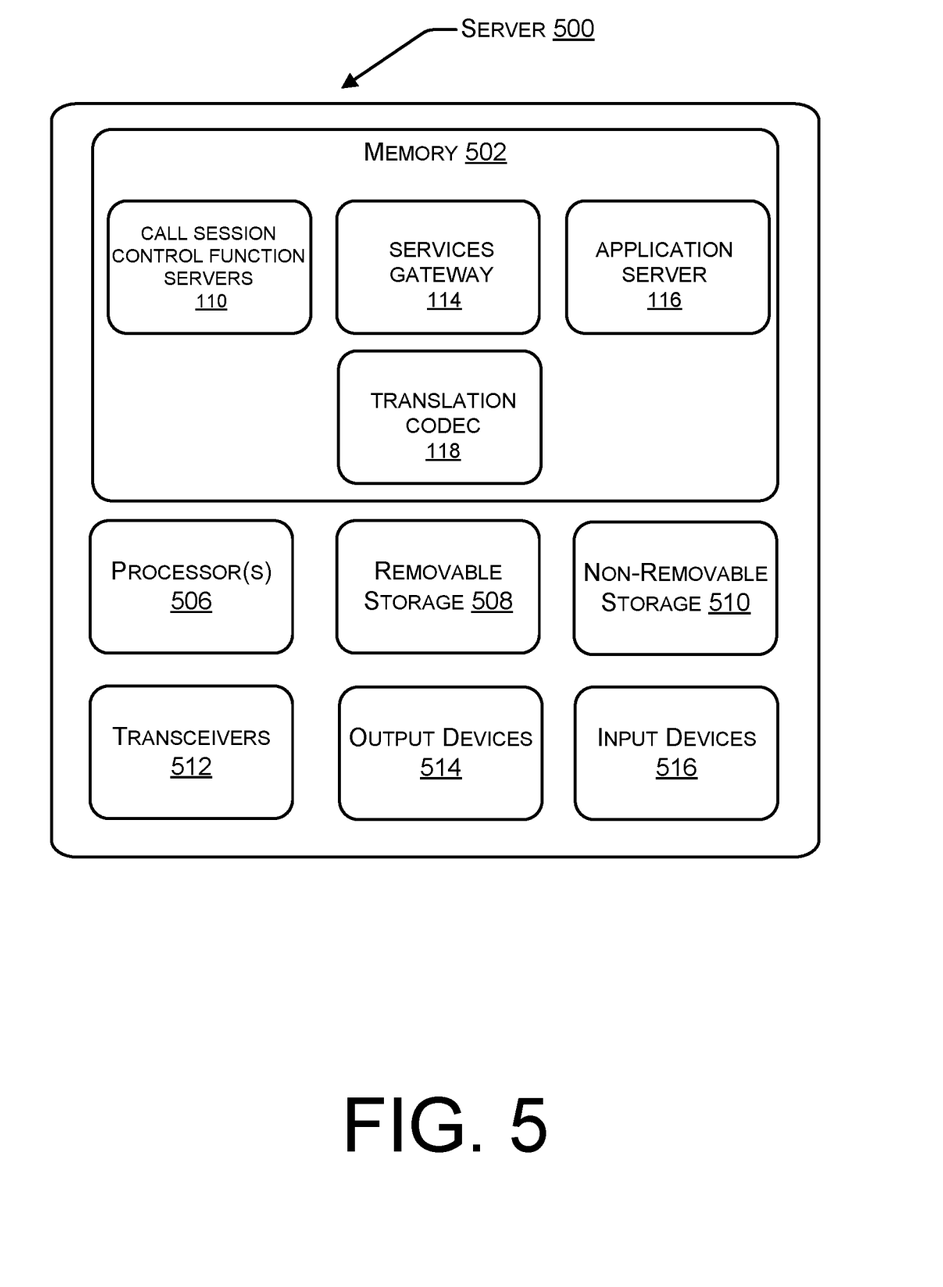
FIG. 5 illustrates a component level view of a server configured for use within a wireless communication network.

FIG. 5 illustrates a component level view of a server 500 configured for use within a wireless communication network in order to provide various services within the wireless communication network, such the application server 116, the call session control function servers 110, the translation codec 118, and the services gateway 114. The server 500 may be located in an IP Multimedia Subsystem ("IMS") or gateway. Additionally, the server 500 may be a separate entity located separately from the IMS or gateway. As illustrated, the server 500 comprises a system memory 502 storing computer-executable instructions to implement the application server 116, the call session control function servers 110, the translation codec 118, and the services gateway 114. The system memory 502 may also store additional applications and programs. Also, the server 500 includes processor(s) 506, a removable storage 508, a non-removable storage 510, transceivers 512, output device(s) 514, and input device(s) 516.

In various implementations, system memory 502 is volatile (such as RAM), non-volatile (such as ROM, flash memory, etc.) or some combination of the two. In some implementations, the processor(s) 506 is a central processing unit (CPU), a graphics processing unit (GPU), or both CPU and GPU, or any other sort of processing unit.

The server 500 may also include additional data storage devices (removable and/or non-removable) such as, for example, magnetic disks, optical disks, or tape. Such additional storage is illustrated in FIG. 5 by removable storage 508 and non-removable storage 510.

Non-transitory computer-readable media may include volatile and nonvolatile, removable and non-removable tangible, physical media implemented in technology for storage of information, such as computer readable instructions, data structures, program modules, or other data. System memory 502, removable storage 508 and non-removable storage 510 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the server 500. Any such non-transitory computer-readable media may be part of the server 500.

In some implementations, the transceivers 512 include any sort of transceivers known in the art. For example, the transceivers 512 may include wired communication components, such as an Ethernet port, for communicating with other networked devices. Also, or instead, the transceivers 512 may include wireless modem(s) to may facilitate wireless connectivity with other computing devices. Further, the transceivers 512 may include a radio transceiver that performs the function of transmitting and receiving radio frequency communications via an antenna.

In some implementations, the output devices 514 include any sort of output devices known in the art, such as a display (e.g., a liquid crystal display), speakers, a vibrating mechanism, or a tactile feedback mechanism. Output devices 514 also include ports for one or more peripheral devices, such as headphones, peripheral speakers, or a peripheral display.

In various implementations, input devices 516 include any sort of input devices known in the art. For example, input devices 516 may include a camera, a microphone, a keyboard/keypad, or a touch-sensitive display. A keyboard/ keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   receiving a request to setup a call between an originating cellular device and a receiving cellular device;
   commencing a call setup message flow to setup the call;
   for each of the originating cellular device and the receiving cellular device,
      receiving cellular device capabilities, cellular device capabilities are specified in a Session Initiation Protocol (SIP) message exchange,
      based on the cellular device capabilities, determining if the originating cellular device or the receiving cellular device is capable of using specified voice services, and
      if the originating cellular device is capable of using specified voice services, instructing the originating cellular device to use the specified voice services, and if the receiving cellular device is capable of using the specified voice services, instructing the receiving cellular device to use the specified voice services;
   determining that the cellular device capabilities specified in the SIP message exchange do not conform to a network operator specification, and determining that one of the originating cellular device or the receiving cellular device associated with the cellular device capabilities is not capable of using the specified voice services regardless of what is specified by the cellular device capabilities; and
   invoking a translation codec if either the originating cellular device or the receiving cellular device is not using the specified voice services.

2. The method of claim 1, wherein the cellular device capabilities are received from a subscriber database.

3. The method of claim 1, wherein determining that a specific one of the originating cellular device or the receiving cellular device is capable of using the specified voice services is based at least in part on a subscription type associated with a user of the specific one of the originating cellular device or the receiving cellular device.

4. The method of claim 1, wherein the cellular device capabilities include an international mobile equipment identifier (IMEI), International Mobile Subscriber Identity (IMSI), a rate plan, or a preference.

5. The method of claim 1, wherein the specified voice services include an enhanced voice service (EVS).

6. A non-transitory computer-readable storage medium having computer-executable instructions stored thereupon that, when executed by a computer, cause the computer to:
   receive a request to setup a call between an originating cellular device and a receiving cellular device;
   commence a call setup message flow to setup the call;
   for each of the originating cellular device and the receiving cellular device,
      receive cellular device capabilities, wherein the cellular device capabilities are specified in a Session Initiation Protocol (SIP) message exchange,
      based on the cellular device capabilities, determine if the originating cellular device or the receiving cellular device is capable of using enhanced voice services (EVS), and
      if the originating cellular device is capable of using enhanced voice services, instruct the originating cellular device to use EVS, and if the receiving cellular device is capable of using enhanced voice services, instruct the receiving cellular device to use EVS;
   determine that the cellular device capabilities specified in the SIP message exchange do not conform to a network operator specification, and determine that one of the originating cellular device or the receiving cellular device associated with the cellular device capabilities is not capable of using EVS regardless of what is specified by the cellular device capabilities; and
   invoke a translation codec if either the originating cellular device or the receiving cellular device is not using EVS.

7. The non-transitory computer-readable storage medium of claim 6, wherein the cellular device capabilities associated with the originating cellular device are received from the originating cellular device.

8. The non-transitory computer-readable storage medium of claim 6, wherein determining that a specific one of the originating cellular device or the receiving cellular device is capable of using EVS is based at least in part on a subscription type associated with a user of the specific one of the originating cellular device or the receiving cellular device.

9. The non-transitory computer-readable storage medium of claim 6, wherein the cellular device capabilities include an international mobile equipment identifier (IMEI).

10. The non-transitory computer-readable storage medium of claim 6, further comprising computer-executable instructions that, when executed by the computer, cause the computer to access a subscriber database to determine if the originating cellular device is configured to be connected using EVS.

11. A system, comprising:
   a non-transitory storage medium; and
   instructions stored in the non-transitory storage medium, the instructions being executable by a cellular device to:
      receive a request to setup a call between an originating cellular device and
   a receiving cellular device;
      commence a call setup message flow to setup the call;
      for each of the originating cellular device and the receiving cellular device,
         receive cellular device capabilities, wherein the cellular device capabilities are specified in a Session Initiation Protocol (SIP) message exchange,
         based on the cellular device capabilities, determine if the originating cellular device or the receiving cellular device is capable of using enhanced voice services (EVS), and
         if the originating cellular device is capable of using enhanced voice services, instruct the originating cellular device to use EVS, and if the receiving cellular device is capable of using enhanced voice services, instruct the receiving cellular device to use EVS;

determine that the cellular device capabilities specified in the SIP message exchange do not conform to a network operator specification, and determine that one of the originating cellular device or the receiving cellular device associated with the cellular device capabilities is not capable of using EVS regardless of what is specified by the cellular device capabilities; and invoke a translation codec if either the originating cellular device or the receiving cellular device is not using EVS.

12. The system of claim 11, wherein the cellular device capabilities associated with the originating cellular device are received from the originating cellular device.

13. The system of claim 11, wherein determining that a specific one of the originating cellular device or the receiving cellular device is capable of using EVS is based at least in part on a subscription type associated with a user of the specific one of the originating cellular device or the receiving cellular device.

14. The system of claim 11, further comprising computer-executable instructions to:

continue the call setup message flow until the call is setup; and translate communications between a cellular device using EVS and a cellular device not using EVS using the translation codec.

\* \* \* \* \*